United States Patent
Sanders

(10) Patent No.: US 8,204,167 B2
(45) Date of Patent: Jun. 19, 2012

(54) MASTER SLAVE INTERFACE

(75) Inventor: Anthony Sanders, Haar (DE)

(73) Assignee: Infineon Technologies AG, Neubiberg (DE)

( * ) Notice: Subject to any disclaimer, the term of this patent is extended or adjusted under 35 U.S.C. 154(b) by 928 days.

(21) Appl. No.: 12/124,476

(22) Filed: May 21, 2008

(65) Prior Publication Data

US 2009/0013114 A1      Jan. 8, 2009

Related U.S. Application Data

(60) Provisional application No. 60/939,264, filed on May 21, 2007.

(51) Int. Cl.
*H04L 7/00* (2006.01)
*G06F 15/16* (2006.01)

(52) U.S. Cl. .......................... 375/371; 709/208

(58) Field of Classification Search .................. 375/354, 375/355, 358, 362, 359, 371, 373, 375, 376; 327/141, 144, 145, 146, 147, 149, 153, 155, 327/156, 158, 161; 709/208
See application file for complete search history.

(56) References Cited

U.S. PATENT DOCUMENTS

| | | | | |
|---|---|---|---|---|
| 5,864,592 | A * | 1/1999 | Itri | 375/375 |
| 7,079,589 | B1 * | 7/2006 | Maksimovic et al. | 375/295 |
| 7,729,464 | B2 * | 6/2010 | Taich et al. | 375/358 |
| 2002/0122503 | A1 * | 9/2002 | Agazzi | 375/316 |
| 2003/0012301 | A1 * | 1/2003 | Walker | 375/305 |
| 2004/0096013 | A1 * | 5/2004 | Laturell et al. | 375/316 |
| 2004/0151506 | A1 * | 8/2004 | Shiramizu et al. | 398/140 |
| 2007/0136594 | A1 * | 6/2007 | Jordan et al. | 713/172 |
| 2007/0283297 | A1 * | 12/2007 | Hein et al. | 716/1 |

* cited by examiner

*Primary Examiner* — David C. Payne
*Assistant Examiner* — Vineeta Panwalkar
(74) *Attorney, Agent, or Firm* — Lee & Hayes, PLLC

(57) ABSTRACT

Implementations related to systems, devices, and methods that make use of a master slave arrangement are described. In some implementations, a master device is configured to generate a clock signal and a slave device is coupled to the master device and is configured to receive the clock signal. The clock signal may control data behavior associated with the master device and the slave device. Additionally, the master device may have a power consumption rate that is lower than the power consumption rate of the slave device.

8 Claims, 5 Drawing Sheets

MASTER SLAVE INTERFACE

CROSS REFERENCE TO RELATED APPLICATIONS

This application claims the priority to, and the benefit of, U.S. Provisional Application No. 60/939,264 filed May 21, 2007, titled "Asymmetric Master Slave Interface," the entire contents of which are incorporated herein by reference.

BACKGROUND

Many systems and architectures involve communication of high bandwidth information between a mainstream technology-based analog front-end, containing an analog-to-digital (AD) converter, and a high end technology based System-On-Chip (SOC). Previous implementations facilitated this communication through use of a slow parallel bus interface or by applying a different architecture in which the AD conversion is implemented on the SOC.

Parallel bus implementations become physically unmanageable and expensive for high bandwidths. Typically, such a wide bus must be implemented with single ended signaling, which is critical for Electromagnetic Emission (EME) in an application where the analog front-end is sensitive.

When AD conversion is implemented on the SOC, the increasing use of lower supply voltages and deeper submicron technologies make the use and design of implementable AD converters very challenging, and it is difficult for the analog design to keep up with fast shrinking technologies used for SOC development.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Disclosed herein are systems, devices and techniques in which a master device is configured to generate a clock signal and a slave device is coupled to the master device and configured to receive the clock signal. The clock signal may control data behavior associated with the master device and the slave device.

At least one implementation described herein enables the communication of information between a slave device having a first power consumption rate and a master device having a second power consumption rate that is lower than the first power consumption rate. The master device may be a deep submicron technology based device and the slave device may be an analog front-end technology based device. As used herein, a deep submicron technology based device refers to a device that is manufactured by processing techniques that are more complex (e.g., at a 45 nm level, a 65 nm level, and so forth) than the processing techniques (e.g., at a 90 nm level, a 130 nm level, and so forth) used to manufacture the front-end technology based device.

In accordance with one implementation, the master device is coupled to the slave device and the master device includes a clock generating unit to generate a clock signal. The slave device is configured to receive and use the clock signal generated by the first device to control data behavior. More particularly, in at least one implementation, the slave device does not incorporate a clock generating unit, which reduces overall power consumption.

Exemplary Environment

Figure 1A:
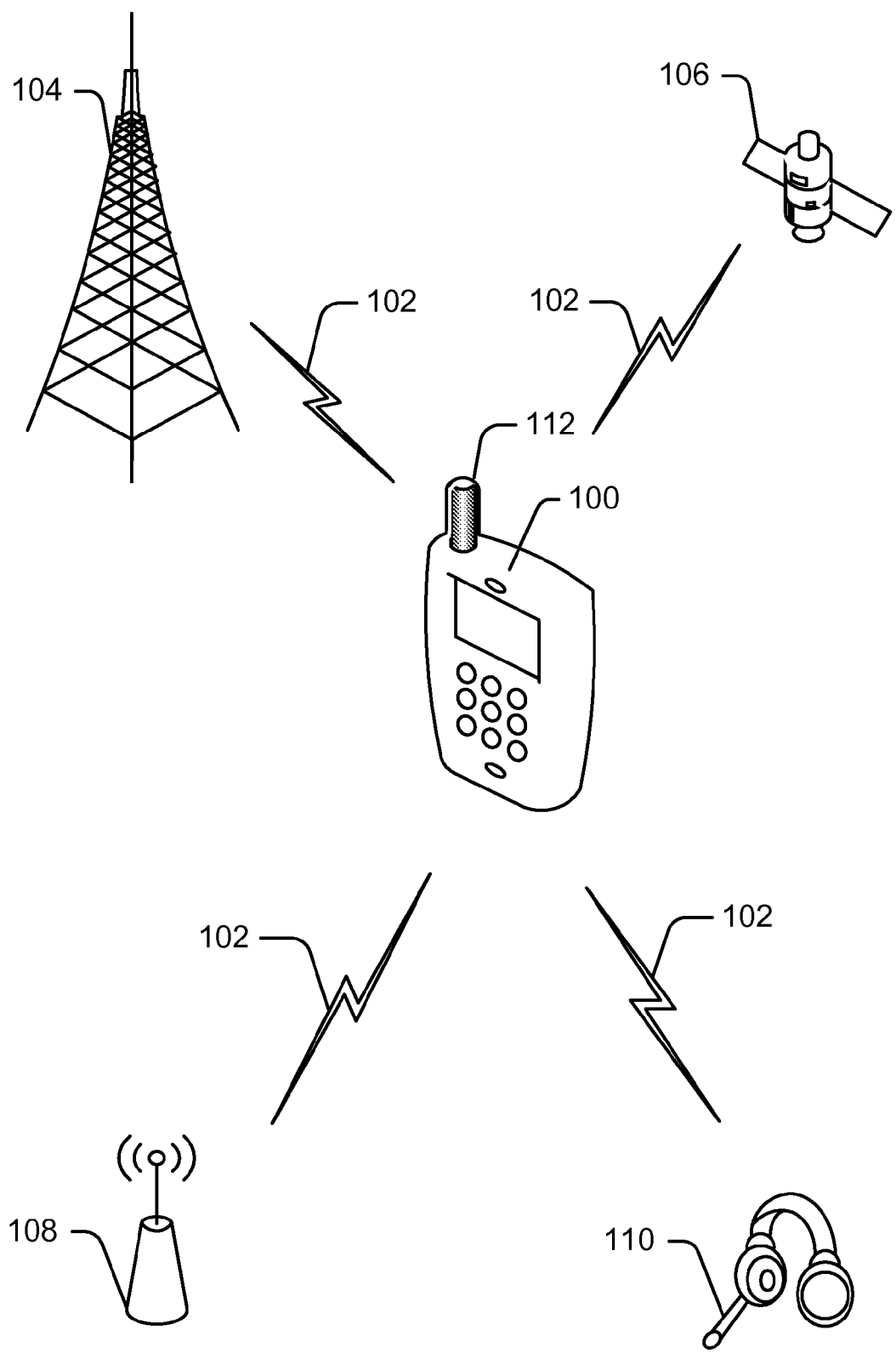
FIG. 1a shows an exemplary mobile device operable to wirelessly communicate with various communication devices.

FIG. 1a shows a wireless device 100 that is operable to send and receive signals 102 in multiple modes. The multiple modes (e.g., GSM, UMTS, and so forth) may be utilized for communication with communications points such as a base station 104, a satellite 106, a wireless access point (WAP) 108, Bluetooth (BT) headset 110, and/or other commutation devices through the use of wireless signals 102, which may be, for example, radio signals.

The wireless device 100 may be a cellular phone, wireless media device, or other device capable of receiving and/or transmitting a radio or other wireless signal 102. For example, the wireless device 100 may be a personal digital assistant (PDA), a portable computing device capable of wireless communication, a media player device, a portable gaming device, a personal computer, a wireless access point (WAP) and/or any other suitable device.

The wireless device 100 includes one or more antennas 112 that may be configured for communication with the base station 104, satellite 106, WAP 108, BT headset 110, and so forth. For example, the wireless device 100 may communicate using a GSM or UMTS mode with the base station 104 as part of a cellular network, in which the base station 104 represents a cellular phone tower or other device capable of transmitting and/or receiving one or more radio or other wireless signals 102 within a cell of a cellular network. The wireless device 100 may also communicate with the BT headset 110 using a BT mode for transmitting and receiving. The wireless device 100 may additionally or alternatively communicate with other communication points using the one or more antennas 112, which may be configured as a multiple-input multiple-output (MIMO), multiple-input single-output (MISO), and/or single-input multiple-output (SIMO) system to transmit and/or receive one or more signals 102 in one or more modes.

Exemplary Device

Figure 1B:
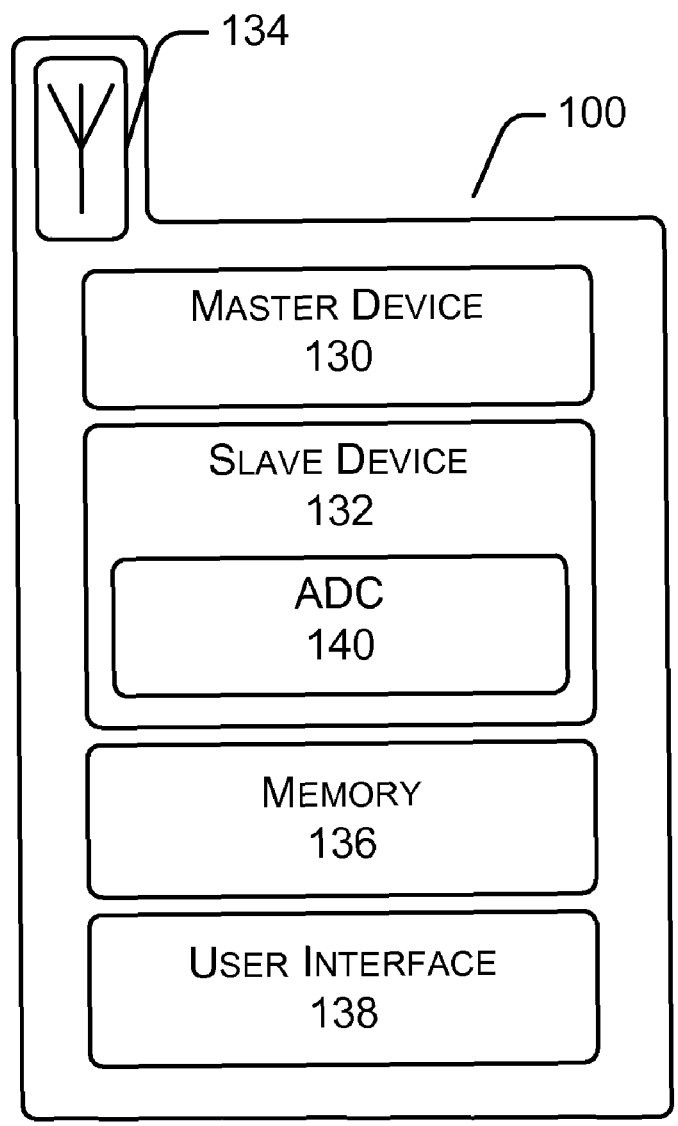
FIG. 1b is a schematic representation of a device having master and slave devices.

FIG. 1b shows an exemplary wireless device 100, including a master device 130 and one or more slave devices 132. The wireless device 100 may be a cellular phone, wireless media device, personal computer or other electronic device. For example, the wireless device 100 may be a personal digital assistant (PDA), a media player device, a portable gaming device, a GPS device, a wireless access point (WAP) and/or any other suitable device.

The master device 130 may include a processor; the slave device 132 may include signal processing components. The signal processing components of slave device 132 process signals received from various sources associated with device 100 including, but not limited to, a master device 130, an antenna 134, memory 136, a user interface 138, and so forth. The slave device 132 may include one or more components to perform analog-to-digital conversion, such as for example an analog to digital converter (ADC) 140.

It will be appreciated by one skilled in the art that FIG. 1a is an exemplary schematic. Thus, certain details of the device 100, including ADC 140, have been omitted for simplicity of discussion.

Exemplary System

Figure 2:
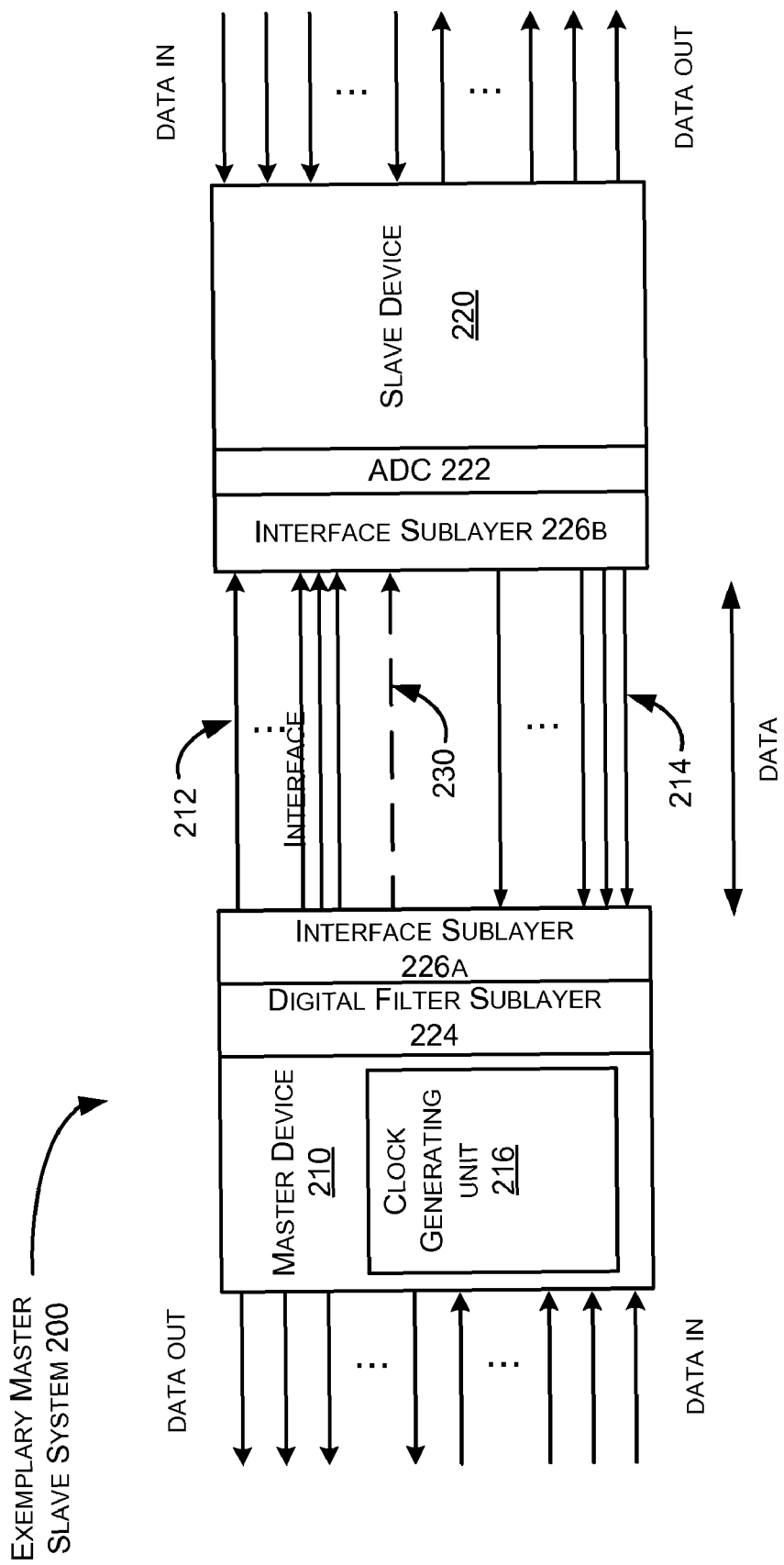
FIG. 2 is a block diagram illustrating a master device interfaced with a slave device.

FIG. 2 shows a block diagram of an example of a master-slave system 200. Exemplary master-slave system 200 comprises a master device 210 coupled to or interfaced with a slave device 220. One of more data lines 212 may be implemented from master device 210 to slave device 220, and one or more data lines 214 may be implemented from slave device 220 to master device 210. Master-slave system 200 may be implemented in single multiple-chip package, multiple single-chip packages, multiple multiple-chip packages, or other types of packages and/or configurations.

Master device 210 comprises, in one embodiment, a deep submicron technology based device, such as a system-on-chip (SOC) or microcontroller device. Slave device 220 may be an analog front-end device such as a remote sensor or an actuator. Slave device 220 may include an Analog to Digital Converter (ADC) 222.

The exemplary master-slave system 200 may also be part of a wireless communications device such as the wireless device 100 shown in FIGS. 1a and 1b. For example, master device 210 may be a processor, microcontroller, or baseband device that operates generally in the digital realm. Slave device 220 may be a signal processing component such as a digital subscriber line (DSL) driver device, a virtual local area network (VLAN) interface, a Universal Mobile Telecommunications System (UMTS) interface, remote sensor, remote actuator, or a Global System for Mobile Communications (GSM) interface.

Master device 210 may be implemented using deep submicron technology (e.g., 45 nm, 65 nm, and so forth) and slave device 220 may be implemented using technologies of less complexity (e.g., 90 nm, 130 nm, and so forth) as that of master device 210. The different technologies used to implement the devices may result in master device 210 being more power efficient than slave device 220. In one embodiment, slave device 220 operates at a first power consumption rate, and master device 210 operates at a second power consumption rate that is lower than the first power consumption rate. To reduce overall power consumption of the master-slave system, the clock generating unit may be incorporated in master device 210. More particularly, in at least one implementation, the slave device 220 does not incorporate a clock generating unit. The clock generating unit in the master device 210 generates a clock signal 230 to control data behavior associated with master device 210 and slave device 220. Clock signal 230 is transported from the master device 210 to slave device 220, hereinafter referred to as the forwarded clock.

The slave device 220 may transmit data associated therewith back to master device 210 by directly using the forwarded clock 230 it receives from master device 210. Slave device 220 may directly sample the data received from master device 210 using the forwarded clock 230. Further, slave device 220 may generate and transmit to master device 210 phase error information to adjust or pre-skew the forwarded clock 230 to achieve correct data sampling.

The master-slave system 200 illustrated in FIG. 2 may also perform clock and data recovery on a duty cycled basis to reduce average circuit activity. Furthermore, the system 200 may include a digital filter sublayer 224 to perform pre-filtering of the phase error information in the slave device 220 before passing phase error information back to master device 210 in-band. The digital filter sublayer 224 may comprise filter circuits (e.g., equalizer) to improve data sampling and/or transmission. In addition, the system may perform local clock or data recovery techniques in master device 210 based on the phase error information received from slave device 220. Interface sublayers 226a and 226b may be utilized to facilitate communication between the master device 210 and the slave device 220.

The exemplary system 200 may utilize high speed differential signaling to reduce the number of chip pins required, with equalization in the receiver to compensate for band limitation in the connecting channel. System 200 may also implement asymmetric clock architecture to take advantage of the low power capability of the deeper submicron technology in master device 210. The system is capable of transmitting a full rate (e.g., 3 gigahertz (GHz) for 3 gigabits per second (Gbps) links) forwarded clock 230 from master device 210 to slave device 220. The full rate clock allows simple use of the clock in the slave device 220. Clock and data ranges of about 1 to 10 GHz and 1 to 10 Gbps, respectively, are also possible with the illustrated system. Higher or lower clock and data ranges than those given are also possible depending on technologies used to implement the system.

Figure 3:
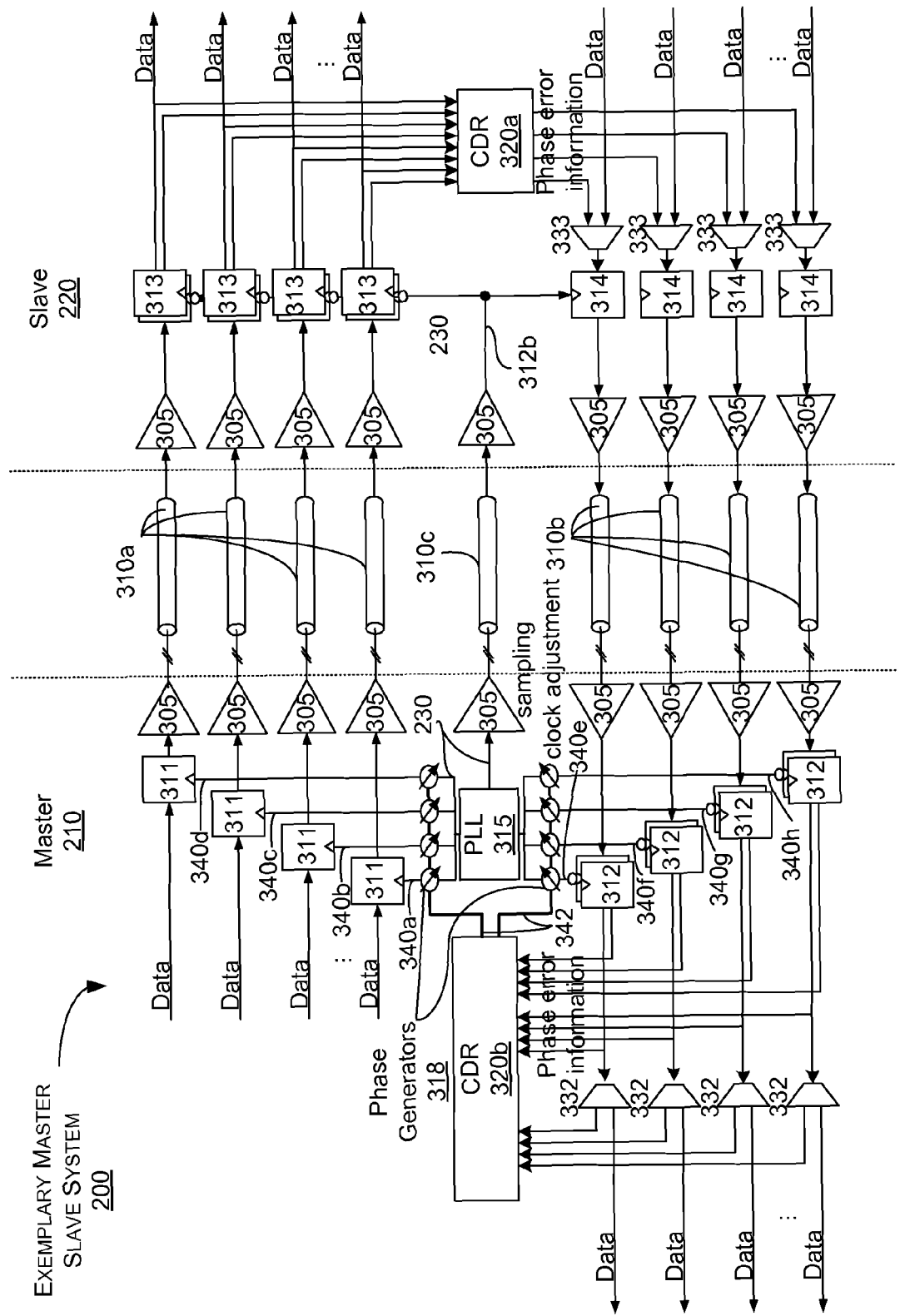
FIG. 3 illustrates a schematic diagram including a master device interfaced with a slave device.

FIG. 3 illustrates one specific implementation of the master-slave system 200. Master device 210 and slave device 220 communicate information via interconnect links 310a-c. Interconnect links 310a-c comprise, for example, data links 310a-b and forwarded clock link 310c. Data information is transmitted between master device 210 and slave device 220 via data links 310a-b. Although four data links 310a from master device 210 to slave device 220 and four data links 310b from slave device 220 to master device 210 are shown, it is understood that any other number of data links are also useful. The data links may transmit information at a high speed of about, for example, 1 to 10 Gbps. Other communication speeds are also possible. The data links may be implemented with low swing, ground reference differential signaling.

In one embodiment, a clock generating unit, such as a phase locked loop (PLL) 315, is incorporated in the master device 210. Although a PLL 315 is shown, it is understood that the clock signal may be generated by other types of clock signal generating units. PLL 315 generates a clock signal 230 to control data behavior associated with master device 210 and slave device 220. Clock signal 230 may comprise a frequency of about 1 to 10 GHz. Other clock frequencies are also possible. Clock signal 230 is transmitted to slave device 220 as a forwarded clocked signal 230 via forwarded clock link 310c.

The forwarded clock signal 230 may be used directly in the slave device 220. Alternatively, the frequency of the forwarded clock signal 230 may be increased (e.g., doubled) in the slave device before being used to control data behavior. In addition, slave device 220 may use the forwarded clock signal 230 directly to sample or transmit data received from the master device or other devices. Either or both of the rising or falling edges of the forwarded clock signal 230 may be used to control data behavior. Slave device 220 may also include small duty cycle correction circuitry for use in conjunction with the forwarded clock.

As shown in FIG. 3, the forwarded clock signal 230 drives or enables latches 311-314 to transmit information between master device 210 and slave device 220 via data links 310a-b. For example, when enabled by clock signal 230, latches 311 in master device 210 transmit received data through respective buffers 305 and data links 310a to latches 313 in slave device 220. Similarly, latches 314 in slave device 220 transmit received data through respective buffers 305 and data links 310b to latches 312 in master device 210. Latches 311 to 314 may be enabled by either the rising or falling edge of the forwarded clock signal 230.

In one implementation, slave device 220 further includes a clock and data recovery (CDR) unit 320a. Master device 210 may also further include a CDR unit 320b. CDR unit 320b provides control signals 342 to control phase generators 318. CDR unit 320b may be configured to control phase generators 318 independently. Phase generators 318 operate to adjust the phase of the clock signal 230 produced by clock generation unit 315. This is done so as to, for example, ensure correct sampling of data received in master device 210.

In one implementation, phase generators 318 phase-shift clock signal 230 to produce pre-skew clock signals 340a-h to clock or enable local circuit elements such as latches 311 and 312. Latches 311 and 312 respectively transmit data to and receive data from the slave device 220. Pre-skew clock signals 340a-h may be generated by the phase generators 318 using various types of methods, including using a phase interpolation technique or a delay-locked loop (DLL) and multiplexer.

CDR unit 320a, associated with slave device 220, generates phase error information to correct the clock signal 230 in the master device 210. In one implementation, CDR unit 320a compares data input signals and determines if there are any phase errors. For example, it may perform an XOR based early/late phase detection using data signal edge samples. Other types of phase detection methods or architectures may also be used. This early/late phase information may be filtered to generate phase error information at a slow rate. The phase error information may be periodically transmitted back to the master device 210 in-band. In one embodiment, the slave device 220 includes multiplexers 333 that multiplex the phase error information with received data bits into a composite data stream. The composite data stream is transmitted via latches 314, buffers 305 and second data links 310b to latches 312 in the master device 210.

Master device 210, after initialization, is aware of the time division multiplexing and extracts this phase error information using, for example, demultiplexers 322. The phase error information is then used by second CDR unit 320b to adjust the phase generators 318 accordingly. Second CDR unit 320b may also generate phase error information by, for example, performing XOR based phase detection, and filtering. However, the phase error information is directly used to steer the sampling clock locally.

Master device 210 may further include filter circuits, such as an equalizer (not shown). The equalizer compensates for distortion of the data signals that may occur during high speed transmission. The equalizer may be, for example, a decision feedback equalizer, which is well understood by one skilled in the art. In one implementation, the equalizer provides a pre-equalizer function. The pre-equalizer function can be, for example, an infinite impulse response filter function or any other suitable function. The coefficients of the pre-equalizer function may be determined based on decision feedback from the slave device.

Exemplary Process

An exemplary process in accordance with the present disclosure will now be described. For simplicity, the process will be described with reference to the exemplary environment 100 and the exemplary system 200 described above with reference to FIGS. 2 through 3.

Figure 4:
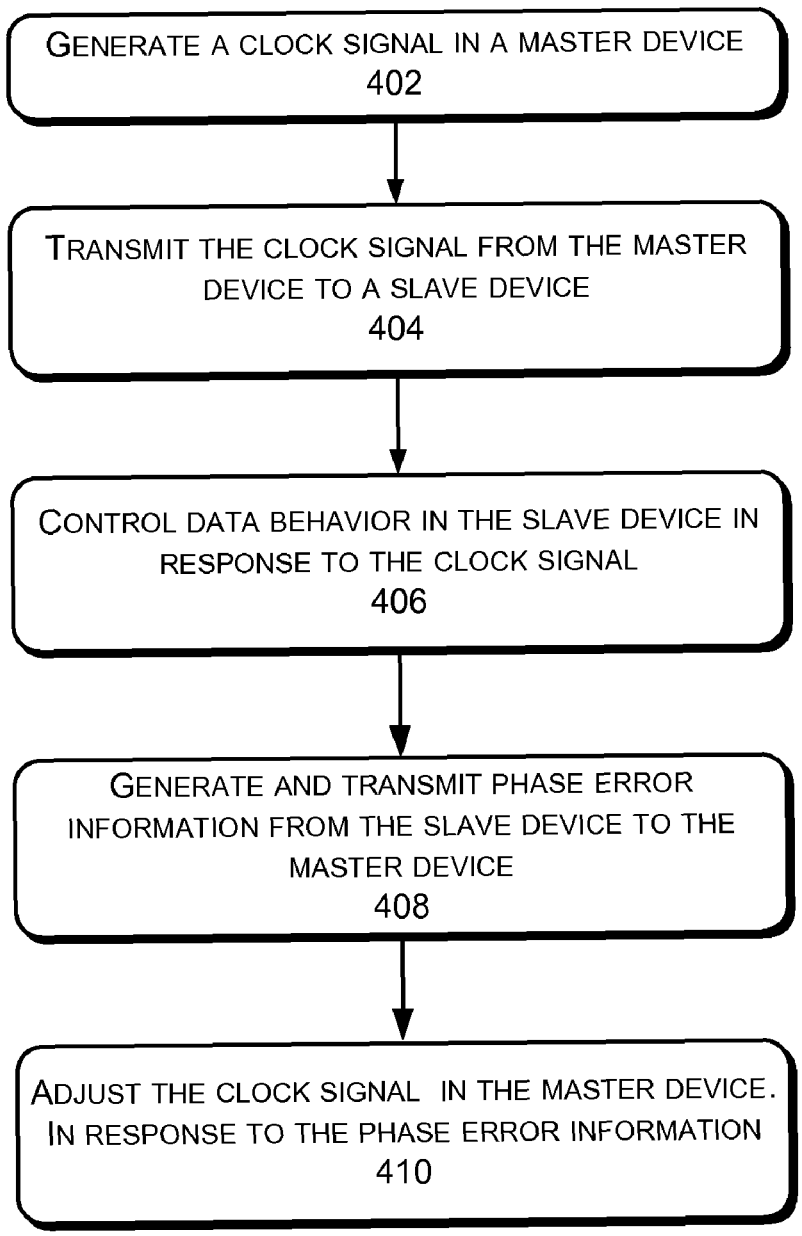
FIG. 4 shows an exemplary method of reducing overall power consumption in a master-slave system.

FIG. 4 shows one exemplary implementation of a process 400 for reducing overall power consumption in a master-slave system. The method may be implemented utilizing system 200 as shown in FIGS. 2 and 3 and may be applied to operation of transmitting or receiving signals. The master-slave system includes a master device having a first power consumption rate and a slave device having a second power consumption rate, the first power consumption rate being lower than the second power consumption rate.

At 402, the master device generates a clock signal. Clock generation is performed in the master device, which is more power efficient than the slave device, in order to reduce overall power consumption of the master-slave system.

At 404, the master device transmits the clock signal to the slave device. The clock signal may be transmitted at a full rate of, for example, about 1 to 10 GHz.

At 406, the slave device uses the clock signal from the master device to control data behavior. The clock signal may be used directly by the slave device, without any modification. Alternatively, the frequency of the clock signal may be increased or decreased before using it to control data behavior. The slave device transmits or receives data from, for example, the master device in response to the clock signal. The slave device uses either or both of the rising and falling edge of the clock signal to control, sample or transmit the data.

At 408, the slave device generates phase error information of the clock signal and transmits the error information to the master device. The phase error information may be generated using samples of data signals using, for example, XOR based early/late phase detection techniques. This phase error information may be periodically transmitted back to the master device in-band. In one embodiment, the slave device multiplexes the phase error information with the data information to produce a composite data stream. The composite data stream is then transmitted to the master device.

At 410, the master device adjusts the phase of the clock signal in response to the phase error information. This is done, for example, to ensure accurate data sampling. The master device may first extract the phase error information from the composite data stream, such that it can use the phase error information to adjust the clock signal accordingly. In one implementation, the master device also generates phase error information for adjusting the clock signal locally.

Although specific details of exemplary methods have been described above, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

Conclusion

For the purposes of this disclosure and the claims that follow, the terms "coupled" and "connected" may have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a slave device;
a master device to couple to the slave device, the master device being more power efficient than the slave device;

a first plurality of phase generators incorporated in the master device and configured to adjust a clock signal produced by the master device to control data received by the master device;

a second plurality of the phase generators incorporated in the master device and configured to adjust the clock signal to control data transmitted by the master device;

a clock and data recovery unit incorporated in the master device, the clock and data recovery unit being configured to adjust one or more of the first plurality of phase generators, one or more of the second plurality of phase generators, or both, based at least partly on phase error information; and an equalizer incorporated in the master device to compensate for signal distortion.

2. The system of claim 1, further comprising a clock generating unit incorporated in the master device to generate the clock signal, the clock signal to control data behavior associated with the master device and the slave device.

3. The system of claim 1 wherein the equalizer comprises a decision feedback equalizer.

4. A method of reducing overall power consumption in a master-slave system, comprising:

generating a clock signal in a master device of a wireless communication device, the master device having a first power consumption rate;

transmitting the clock signal from the master device to a slave device of the wireless communication device, the slave device having a second power consumption rate, wherein the first power consumption rate is lower than the second power consumption rate;

sampling data received by the slave device, data transmitted from the slave device, or both, in response to the clock signal, the data received by the slave device being provided by the master device and an antenna of the wireless communication device and the data transmitted from the slave device being transmitted to the master device and the antenna;

generating phase error information of the clock signal in the slave device;

transmitting the phase error information from the slave device to the master device; and adjusting the clock signal in response to the phase error information.

5. The method of claim 4 further comprising increasing the frequency of the clock signal in the slave device.

6. The method of claim 4 wherein generating phase error information comprises XOR based early/late phase detection.

7. The method of claim 4 wherein transmitting the phase error information from the slave device to the master device comprises:

multiplexing the phase error information with data information to produce a composite data stream; and transmitting the composite data stream from the slave device to the master device.

8. The method of claim 4 further comprises generating phase error information in the master device.

* * * * *